(12) United States Patent
Nakajima

(10) Patent No.: US 9,534,555 B2
(45) Date of Patent: Jan. 3, 2017

(54) CONTROL DEVICE AND METHOD FOR INTERNAL COMBUSTION ENGINE

(75) Inventor: Toshiya Nakajima, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 179 days.

(21) Appl. No.: 14/110,887

(22) PCT Filed: Apr. 21, 2011

(86) PCT No.: PCT/JP2011/059851
§ 371 (c)(1),
(2), (4) Date: Oct. 9, 2013

(87) PCT Pub. No.: WO2012/144051
PCT Pub. Date: Oct. 26, 2012

(65) Prior Publication Data
US 2014/0034024 A1 Feb. 6, 2014

(51) Int. Cl.
| | | |
|---|---|---|
| F02B 7/00 | (2006.01) | |
| F02D 41/30 | (2006.01) | |
| F02D 19/06 | (2006.01) | |
| F02D 19/08 | (2006.01) | |
| F02D 41/00 | (2006.01) | |

(Continued)

(52) U.S. Cl.
CPC ........... *F02D 41/30* (2013.01); *F02D 19/0647* (2013.01); *F02D 19/0692* (2013.01); *F02D 19/081* (2013.01); *F02D 41/0025* (2013.01); *F02D 41/3047* (2013.01); *F02B 29/0406* (2013.01); *F02B 37/00* (2013.01); *F02M 21/0281* (2013.01); *Y02T 10/36* (2013.01)

(58) Field of Classification Search
CPC .... F02D 41/30; F02D 19/081; F02D 19/0647; F02D 19/0649; F02D 19/0692
USPC ........... 123/299, 300, 304, 27 GE, 525, 431, 123/568.21, 198 A, 575; 701/103, 108
See application file for complete search history.

(56) References Cited

U.S. PATENT DOCUMENTS 7,284,506 B1 * 10/2007 Sun et al. ..................... 123/1 A
8,037,850 B2 * 10/2011 Pursifull .......................... 123/3
(Continued)

FOREIGN PATENT DOCUMENTS

| DE | 10146063 | 4/2003 |
|---|---|---|
| JP | 57-168036 | 10/1982 |

(Continued)

*Primary Examiner* — Hai Huynh
(74) *Attorney, Agent, or Firm* — Finnegan, Henderson, Farabow, Garrett & Dunner, LLP

(57) ABSTRACT

It is an object of the invention to provide an at of realizing good combustion by lowering a combustion critical temperature below a temperature of intake air sucked into a cylinder, in the case where a first fuel that is difficult to ignite and a second fuel that is easy to ignite are supplied into the cylinder. The invention is a control device for an internal combustion engine that includes a control unit that supplies a first fuel that is difficult to ignite and a second fuel that is easy to ignite into a cylinder, and burns the first fuel that is difficult to ignite as well by igniting the second fuel that is easy to ignite, wherein the control unit carries out at least one of a reduction in a supply amount of the first fuel that is difficult to ignite and an increase in a supply amount of the second fuel that is easy to ignite, if a temperature of intake air sucked into the cylinder falls below a combustion critical temperature.

5 Claims, 19 Drawing Sheets

(51) Int. Cl.
*F02B 29/04* (2006.01)
*F02B 37/00* (2006.01)
*F02M 21/02* (2006.01)

(56) References Cited

U.S. PATENT DOCUMENTS

| | | | |
|---|---|---|---|
| 8,307,790 B2 * | 11/2012 | Leone et al. | 123/3 |
| 8,402,928 B2 * | 3/2013 | Leone et al. | 123/3 |
| 8,613,263 B2 * | 12/2013 | Leone et al. | 123/3 |
| 2013/0104850 A1 * | 5/2013 | Long et al. | 123/445 |

FOREIGN PATENT DOCUMENTS

| | | |
|---|---|---|
| JP | 8-158980 | 6/1996 |
| JP | 2008-223542 | 9/2008 |
| JP | 2009-180132 | 8/2009 |
| JP | 2010-133337 | 6/2010 |

\* cited by examiner

CONTROL DEVICE AND METHOD FOR INTERNAL COMBUSTION ENGINE

CROSS-REFERENCE TO RELATED APPLICATIONS

This application is a national phase application of International Application No. PCT/JP2011/059851, filed Apr. 21, 2011, the content of which is incorporated herein by reference.

TECHNICAL FIELD

The invention relates to a control device for an internal combustion engine and a control method for an internal combustion engine.

BACKGROUND ART

There has been disclosed an internal combustion engine that uses CNG (compressed natural gas) that is difficult to ignite and light oil that is easy to ignite as a main fuel and a supplementary fuel respectively, and supplies both the fuels into a cylinder to burn the fuels during engine operation at substantially intermediate and high loads (e.g., see Patent Document 1). In this internal combustion engine, in the case where the aforementioned both the fuels are supplied into the cylinder, CNG as the main fuel, which is difficult to ignite, is burned by igniting light oil.

RELATED ART DOCUMENT

Patent Document

Patent Document 1: Japanese Patent Application Publication No. 08-158980 (SP-08-158980

SUMMARY OF THE INVENTION

Problem to be Solved by the Invention

By the way, when the first fuel that is difficult to ignite, such as CNG, and the second fuel that is easy to ignite, such as light oil, are thus supplied into the cylinder, a combustion critical temperature as a lower-limit temperature of intake air sucked into the cylinder, at which the fuels can be burned, may rise. If the combustion critical temperature rises, the temperature of intake air sucked into the cylinder may fall below the combustion critical temperature, so that the exhaust emission properties may deteriorate due to a deterioration in combustion in the cylinder.

The invention has been made in view of the aforementioned circumstances. It is an object of the invention to provide an art of realizing good combustion by lowering a combustion critical temperature below a temperature of intake air sucked into a cylinder, in the case where a first fuel that is difficult to ignite and a second fuel that is easy to ignite are supplied into the cylinder.

Means for Solving the Problem

In the invention, the following configuration is adopted. That is, the invention is a control device for an internal combustion engine that includes a control unit that supplies a first fuel that is difficult to ignite and a second fuel that is easy to ignite into a cylinder, and burns the first fuel that is difficult to ignite as well by igniting the second fuel that is easy to ignite, wherein the control unit carries out at least one of a reduction in a supply amount of the first fuel that is difficult to ignite and an increase in a supply amount of the second fuel that is easy to ignite, if a temperature of intake air sucked into the cylinder falls below a combustion critical temperature.

It should be noted herein that the combustion critical temperature is a lower-limit temperature of intake air sucked into the cylinder, at which the fuels can be burned. A fall in the temperature of intake air sucked into the cylinder below the combustion critical temperature includes a case where the temperature of intake air is estimated to fall below the combustion critical temperature, as well as a case where the temperature of intake air falls into a state of being lower than the combustion critical temperature.

The first fuel that is difficult to ignite needs a high temperature to be ignited (burned), and raises the combustion critical temperature. On the other hand, the second fuel that is easy to ignite is easy to ignite, does not need a high temperature to be ignited (burned), and hence lowers the combustion critical temperature. In the invention, if the temperature of intake air sucked into the cylinder falls below the combustion critical temperature, at least one of a reduction in the supply amount of the first fuel that is difficult to ignite and an increase in the supply amount of the second fuel that is easy to ignite is carried out. According to the invention, the supply amount of the first fuel that is difficult to ignite, which is predisposed to raise the combustion critical temperature, is reduced, so that the combustion critical temperature can be lowered. Alternatively, the supply amount of the second fuel that is easy to ignite, which is predisposed to lower the combustion critical temperature, is increased, so that the combustion critical temperature can be lowered. Accordingly, if the temperature of intake air sucked into the cylinder falls below the combustion critical temperature, good combustion can be realized by lowering the combustion critical temperature below the temperature of intake air sucked into the cylinder. Thus, the exhaust emission properties can be restrained from deteriorating.

The control unit may carry out at least one of a reduction in the supply amount of the first fuel that is difficult to ignite and an increase in the supply amount of the second fuel that is easy to ignite, if the temperature of intake air sucked into the cylinder falls below the combustion critical temperature during transient operation of the internal combustion engine.

According to the invention, if the temperature of intake air sucked into the cylinder falls below the combustion critical temperature during transient operation of the internal combustion engine, good combustion can be realized by lowering the combustion critical temperature below the temperature of intake air sucked into the cylinder.

The control unit may carry out at least one of a reduction in the supply amount of the first fuel that is difficult to ignite and an increase in the supply amount of the second fuel that is easy to ignite, if light oil as a fuel has a low cetane value and the temperature of intake air falls below the combustion critical temperature.

According to the invention, if light oil as a fuel has a low cetane value and the temperature of intake air falls below the combustion critical temperature, good combustion can be realized by lowering the combustion critical temperature below the temperature of intake air sucked into the cylinder.

The control unit may carry out at least one of a reduction in the supply amount of the first fuel that is difficult to ignite and an increase in the supply amount of the second fuel that is easy to ignite, if CNG as a fuel contains large amounts of $CO_2$ and $N_2$ and the temperature of intake air falls below the combustion critical temperature.

According to the invention, if CNG as a fuel contains large amounts of $CO_2$ and $N_2$ and the temperature of intake air falls below the combustion critical temperature, good combustion can be realized by lowering the combustion critical temperature below the temperature of intake air sucked into the cylinder.

In the invention, the following configuration is adopted. That is, the invention is a control method for an internal combustion engine that supplies a first fuel that is difficult to ignite and a second fuel that is easy to ignite into a cylinder, and burns the first fuel that is difficult to ignite as well by igniting the second fuel that is easy to ignite, including carrying out at least one of a reduction in a supply amount of the first fuel that is difficult to ignite and an increase in a supply amount of the second fuel that is easy to ignite, if a temperature of intake air sucked into the cylinder falls below a combustion critical temperature.

According to the invention as well, if the temperature of intake air sucked into the cylinder falls below the combustion critical temperature, good combustion can be realized by lowering the combustion critical temperature below the temperature of intake air sucked into the cylinder. Thus, the exhaust emission properties can be restrained from deteriorating.

Effect of the Invention

According to the invention, in the case where the first fuel that is difficult to ignite and the second fuel that is easy to ignite are supplied into the cylinder, good combustion can be realized by lowering the combustion critical temperature below the temperature of intake air sucked into the cylinder.

MODES FOR CARRYING OUT THE INVENTION

Concrete embodiments of the invention will be described hereinafter.

<First Embodiment>

Figure 1:
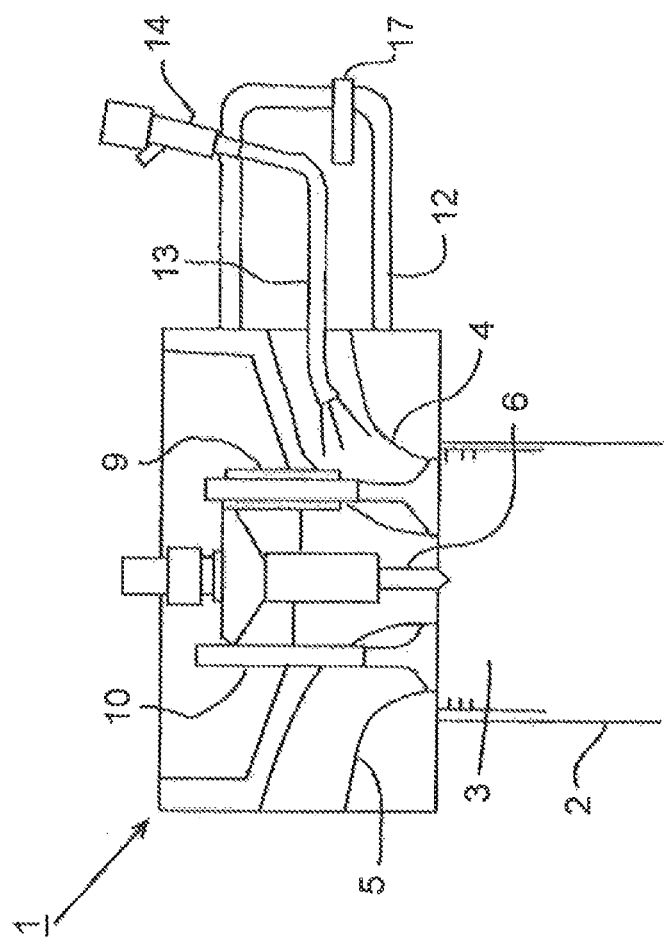
FIG. 1 is a view showing a schematic cross-section of an internal combustion engine according to a first embodiment of the invention.
Figure 2:
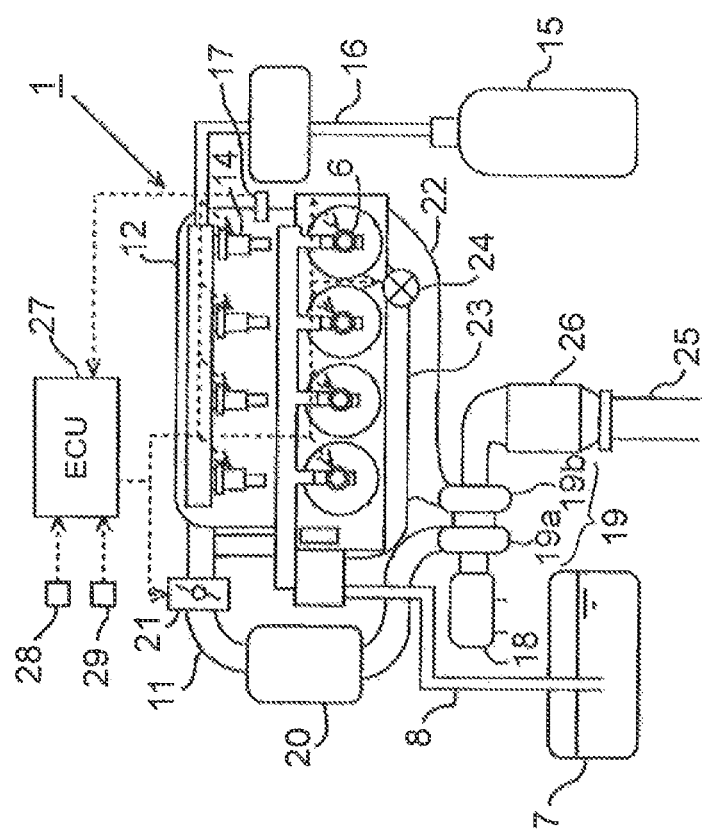
FIG. 2 is a view showing a schematic configuration of the internal combustion engine according to the first embodiment of the invention.

FIG. 1 is a view showing a schematic cross-section of an internal combustion engine to which a control device for an internal combustion engine according to the first embodiment of the invention is applied. FIG. 2 is a view showing a schematic configuration of the internal combustion engine according to this embodiment of the invention. CNG (compressed natural gas) and light oil are used as fuels of an internal combustion engine 1. CNG corresponds to the first fuel that is difficult to ignite according to the invention. Instead of CNG, a fuel that is difficult to ignite, such as a gas fuel that is mainly made of methane or the like, can be used as the first fuel that is difficult to ignite. Light oil corresponds to the second fuel that is easy to ignite according to the invention. The second fuel that is easy to ignite can also be said to be a compressible and ignitable fuel, due to the use of light oil. The internal combustion engine 1 uses CNG (compressed natural gas) that is difficult to ignite and light oil that is easy to ignite as a main fuel and a supplementary fuel respectively. The internal combustion engine 1 makes it possible to supply both the fuels into a cylinder 2, and burn the fuels through compression ignition.

In an upper portion in the cylinder 2 of the internal combustion engine 1, a combustion chamber 3 is defined and formed by an upper wall of the cylinder 2, an inner wall of the cylinder 2, and a top face of a piston (not shown) located below. An intake port 4 and an exhaust port 5 are connected to an upper portion of the combustion chamber 3. A light oil injection valve 6 that injects light oil into the cylinder 2 is provided at an in-between center of the upper portion of the cylinder 2 to which the intake port 4 and the exhaust port 5 are connected. Light oil trapped in a light oil tank 7 is supplied to the light oil injection valve 6 via a light oil supply system 8. An opening portion of the intake port 4 that leads to the combustion chamber 3 is opened/closed by an intake valve 9. An opening portion of the exhaust port 5 that leads to the combustion chamber 3 is opened/closed by an exhaust valve 10.

An intake manifold 12 that leads to an intake pipe 11 is connected upstream of the intake port 4. A CNG injection valve 14 that injects CNG into the intake port 4 via a distribution pipe 13 that leads to the intake port 4 from an upper portion of the intake manifold 12 is provided at the upper portion of the intake manifold 12. CNG trapped in a CNG tank 15 is supplied to the CNG injection valve 14 via a CNG supply system 16. In the intake manifold 12, a temperature sensor 17 that detects a temperature of intake air in the intake manifold 12 is arranged. In the intake pipe 11, an air cleaner 18, a compressor 19a of a turbocharger 19, an intercooler 20, and a throttle valve 21 are arranged in this order from an upstream side.

Intake air that has been taken into the intake pipe 11 from the outside of the engine flows through the intake manifold 12. CNG is injected by the CNG injection valve 14 at the intake port 4, and is sucked into the cylinder 2. Light oil is injected by the light oil injection valve 6 into the intake air sucked into the cylinder 2, at a timely timing such as a compression stroke or the like. If the piston rises to the vicinity of a compression top dead center with the interior of the cylinder 2 in this state, light oil that is easy to ignite is first ignited through compression to be burned, so that CNG that is difficult to ignite is also burned in the wake of the combustion of this light oil.

An exhaust manifold 22 is connected to the exhaust port 5 of the internal combustion engine 1. An EGR pipe 23 through which EGR gas as part of exhaust gas is recirculated is provided from the exhaust manifold 22 to the intake pipe 11. An EGR valve 24 that adjusts the amount of EGR gas flowing through the EGR pipe 23 is arranged in the EGR pipe 23. An exhaust pipe 25 is connected downstream of the exhaust manifold 22 via a turbine 19h of the turbocharger 19. An exhaust gas purification device 26 that purifies exhaust gas is arranged in the exhaust pipe 25. Exhaust gas that has been burned in the cylinder 2 flows out from the exhaust port 5 to the exhaust manifold 22, drives the turbine 19b, is purified by the exhaust gas purification device 26 of the exhaust pipe 25, and then is discharged to the outside of the engine.

An electronic control unit (an ECU) 27 for controlling the internal combustion engine 1 is established as an annex in the internal combustion engine 1. The ECU 27 is a unit that controls the operation state of the internal combustion engine 1 in accordance with the operation condition of the internal combustion engine 1 and the request of a driver. Various sensors such as a temperature sensor 17, an accelerator opening degree sensor 28, a crank angle sensor 29 and the like are connected to the ECU 27 via electric wiring, and output signals of these various sensors are input to the ECU 27. On the other hand, the light oil injection valve 6, the CNG injection valve 14, the throttle valve 21, the EGR valve 24 and the like are connected to the ECU 27 via electric wiring. These instruments are controlled by the ECU 27.

Then, the ECU 27 causes the CNG injection valve 14 to inject CNG that is difficult to ignite as the main fuel, causes the light oil injection valve 6 to inject the light oil that is easy to ignite as the supplementary fuel, and burns these fuels through compression ignition. The ECU 27 that performs this control corresponds to the control unit of the invention.

(Acceleration Control)

Figure 3:
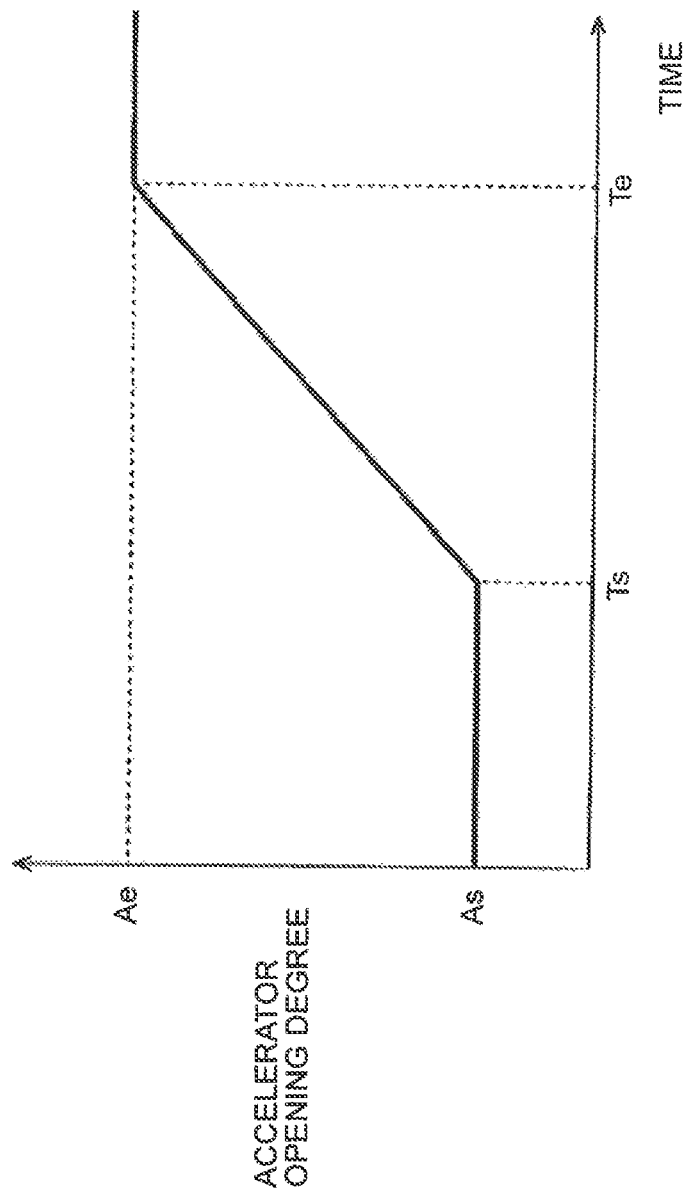
FIG. 3 is a view showing a change in accelerator opening degree over time during acceleration.
Figure 4:
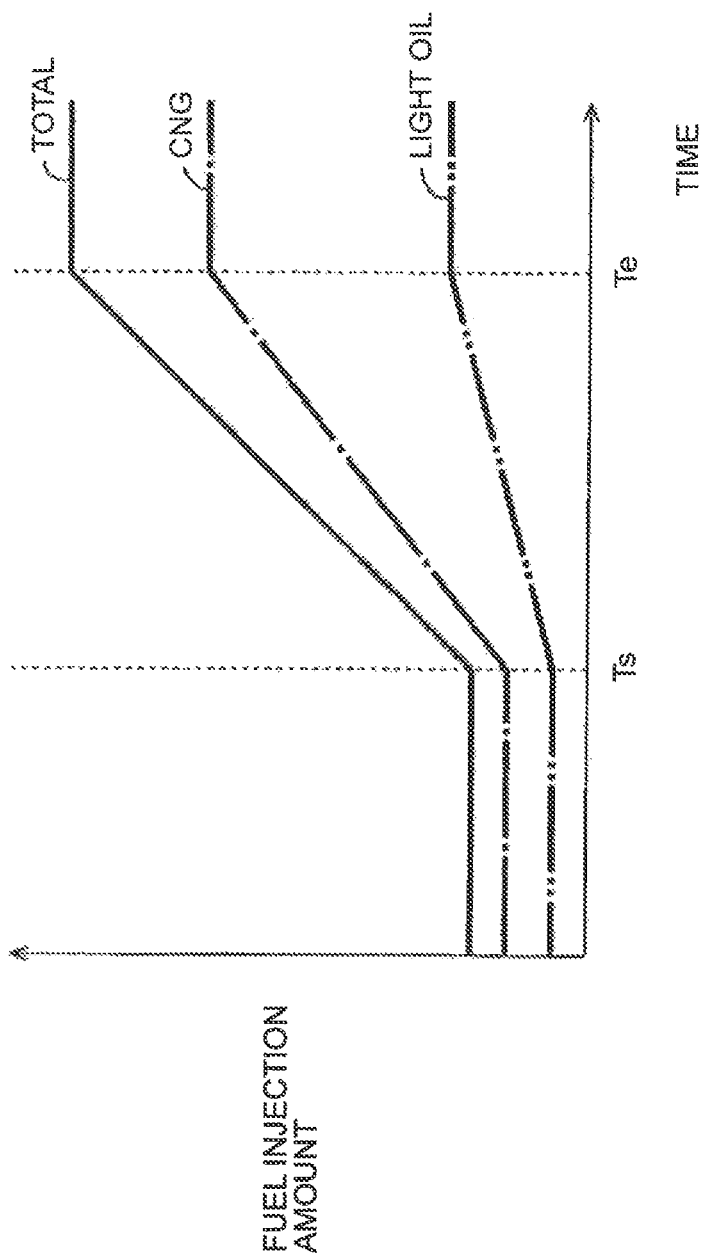
FIG. 4 is a view showing changes in fuel injection amount over time during acceleration according to the related art.
Figure 5:
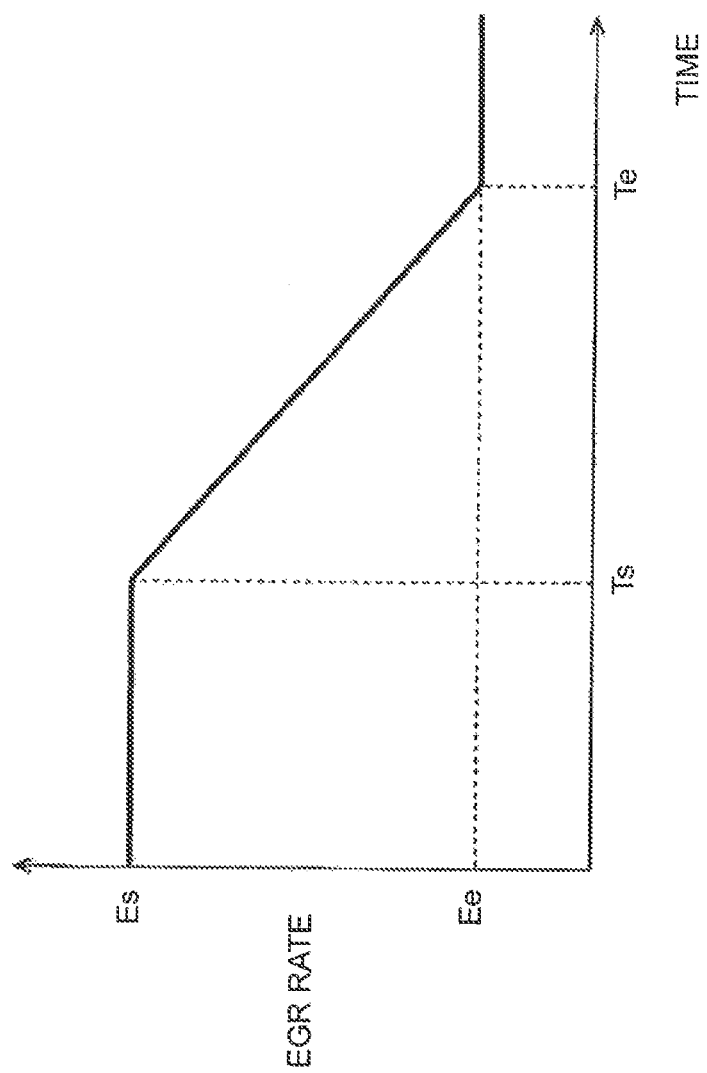
FIG. 5 is a view showing a change in EGR rate over time during acceleration according to the related art.
Figure 6:
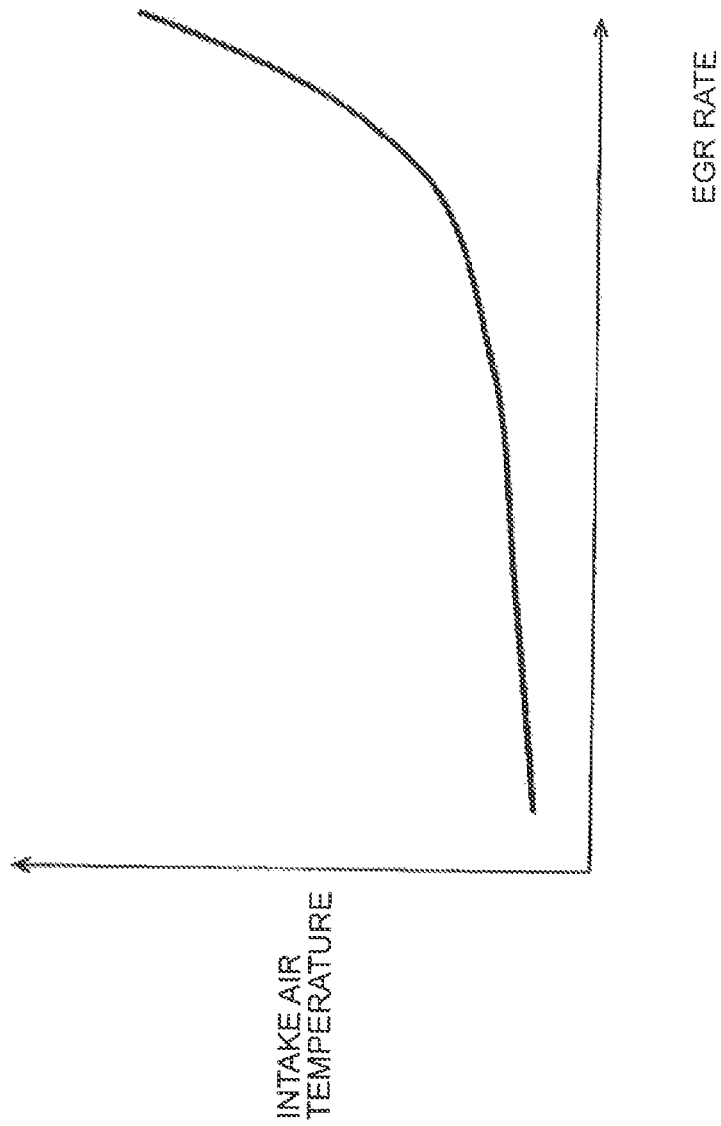
FIG. 6 is a view showing a relationship between EGR rate and intake air temperature in an intake manifold.
Figure 7:
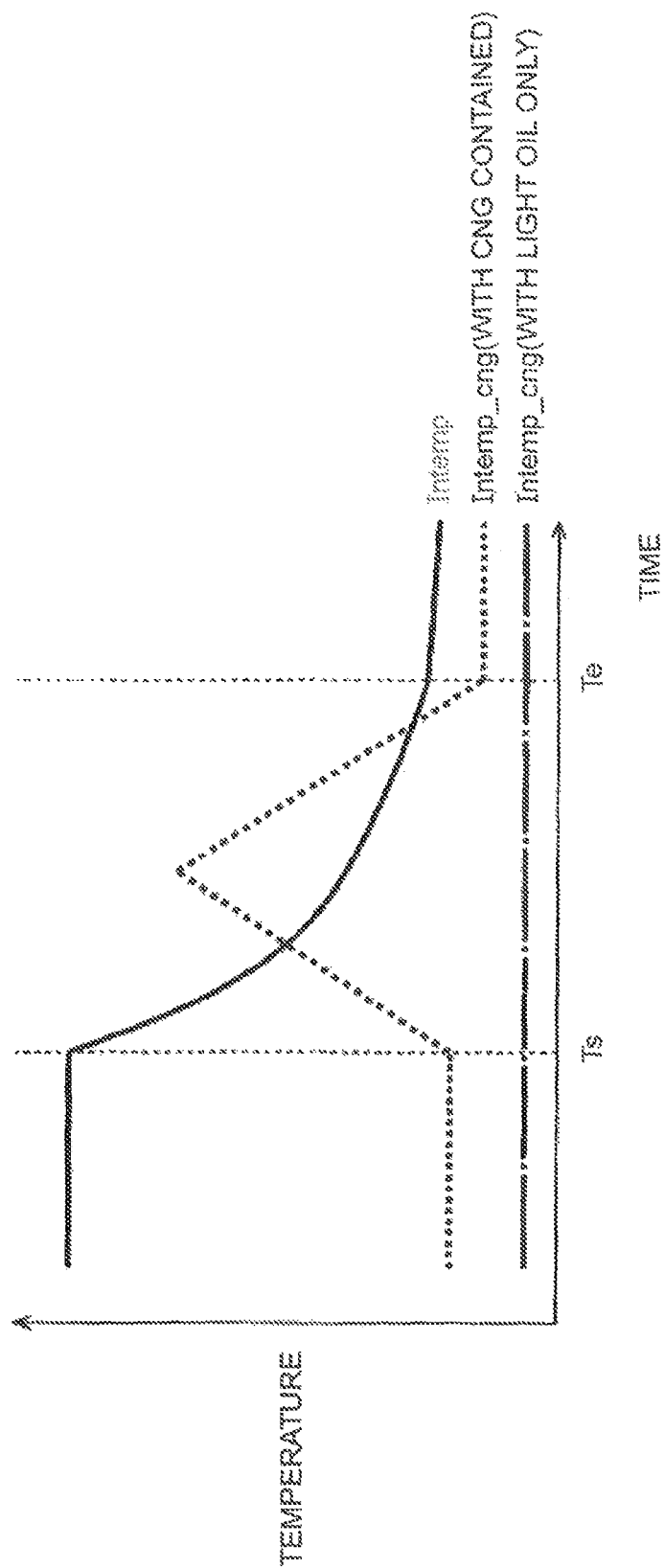
FIG. 7 is a view showing changes in intake air temperature in an intake manifold and combustion critical temperature over time during acceleration according to the related art.
Figure 8:
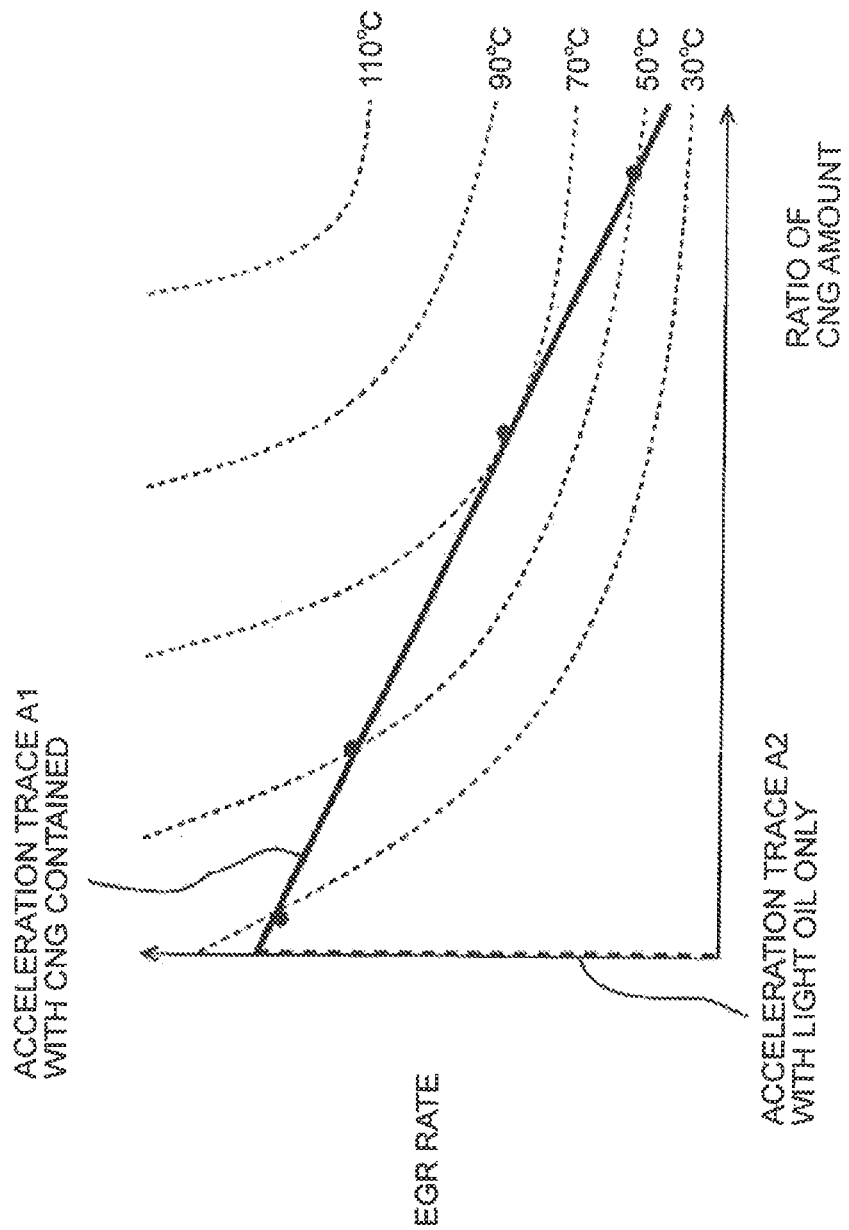
FIG. 8 is a view showing a map that derives a combustion critical temperature from a ratio of an amount of CNG in fuel and an EGR rate according to the related art.
Figure 9:
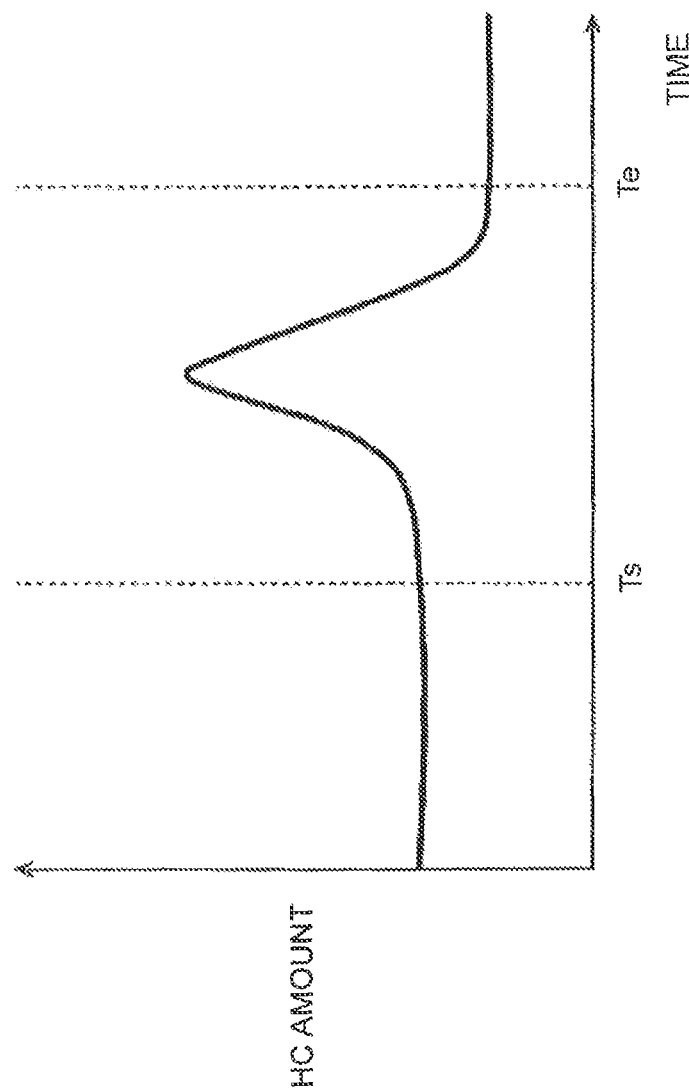
FIG. 9 is a view showing an amount of HC discharged from an internal combustion engine during acceleration according to the related art.

Control during acceleration according to the related art will be described hereinafter. FIG. 3 is a view showing changes in accelerator opening degree over time during acceleration. As shown in FIG. 3, an accelerator opening degree that is detected by the accelerator opening degree sensor 28 at a time Ts is an opening degree As. Therefore, an accelerator is depressed to accelerate a vehicle, and the accelerator opening degree is changed into an opening degree Ae at a time Te. FIG. 4 is a view showing changes in fuel injection amount over time during acceleration according to the related art. As shown in FIG. 4, if acceleration is started at the time Ts, the supply amounts of CNG and light oil as fuels are also increased. At this time, since CNG is the main fuel, the width of increase in the amount of CNG is larger than the width of increase in the amount of light oil. FIG. 5 is a view showing a change in EGR rate over time during acceleration according to the related art. As shown in FIG. 5, as the supply amounts of CNG and light oil are increased from the time Ts, the amount of intake air is also increased. On the other hand, the amount of EGR gas is not increased by an amount corresponding to the increase in the amount of intake air, so that the EGR rate decreases. FIG. 6 is a view showing a relationship between the EGR rate and the temperature of intake air in the intake manifold 12. EGR gas is high-temperature exhaust gas. Therefore, in the case where the amount of EGR gas does not increase very much due to a decrease in the EGR rate, the temperature of intake air in the intake manifold 12 also decreases in accordance with the amount of fresh air. FIG. 7 is a view showing changes in the temperature of intake air in the intake manifold 12 and the combustion critical temperature over time during acceleration according to the related art. During acceleration, the EGR rate decreases as shown in FIG. 5. Therefore, the temperature of intake air in the intake manifold 12 also falls as shown in FIG. 6, and the temperature of intake air in the intake manifold 12 changes as indicated by a solid line shown in FIG. 7. FIG. 8 is a view showing a map that derives a combustion critical temperature from a ratio of an amount of CNG in fuel and an EGR rate according to the related art. During acceleration according to the related art, the EGR rate decreases while the ratio of the amount of CNG in fuel increases, so that the combustion critical temperature is indicated by a line A1 as shown in FIG. 8. Thus, if the line A1 shown in FIG. 8 is plotted on FIG. 7 to express a change in combustion critical temperature over time, the change in combustion critical temperature over time changes as indicated by a broken line shown in FIG. 7. That is, the combustion critical temperature temporarily rises during acceleration as shown in FIG. 7, and the change in combustion critical temperature over time rises in a mountain shape. If the combustion critical temperature thus rises, the temperature of intake air in the intake manifold 12, which is sucked into the cylinder 2, falls below the combustion critical temperature, and the combustion in the cylinder 2 deteriorates. As a result, misfire or an increase in the amount of discharged HC is caused, and the exhaust emission properties deteriorate. It should be noted herein that the combustion critical temperature is a lower-limit temperature of intake air sucked into the cylinder 2 at which fuel can be burned. FIG. 9 is a view showing the amount of HC discharged from the internal combustion engine 1 during acceleration according to the related art. As indicated by a solid line in FIG. 9, in a region in which the temperature of intake air in the intake manifold 12 has fallen below the combustion critical temperature, the amount of HC increases due to a deterioration in combustion such as misfire, an increase in the amount of discharged HC, or the like. As a result, the exhaust emission properties deteriorate.

A rise in combustion critical temperature, which constitutes a factor of a fall in the temperature of intake air in the intake manifold 12 below the combustion critical temperature as described above, is caused because the temperature necessary for ignition (combustion) of CNG is difficult to obtain from the temperature of intake air and the temperature in the cylinder despite an increase in the ratio of the amount of CNG during engine operation at an intermediate load in the course of acceleration. On the other hand, during engine operation at a low load, the EGR rate is high, and the temperature of intake air is high due to a high temperature obtained from EGR gas, so that the temperature necessary for ignition (combustion) of CNG can be obtained from the temperature of intake air. During engine operation at a high load, the temperature in the cylinder during operation is high, so that the temperature necessary for ignition (combustion) of CNG can be obtained from the temperature in the cylinder. Thus, during engine operation at a high load, the temperature of intake air may be low. In this manner, during engine operation at an intermediate load in the course of acceleration, the temperature in the cylinder during operation is not very high. Therefore, with a view to obtaining a necessary temperature from the temperature of intake air, there arises a need to increase the EGR rate that has a positive correlation with the temperature of intake air in such a manner as to raise the temperature of intake air in the intake manifold 12. In consequence, the combustion critical temperature rises as shown in the map of FIG. 8.

Incidentally, the rise in combustion critical temperature as described above results from an increase in the ratio of the amount of CNG. Thus, in the case where only light oil whose amount of CNG is zero is used as a fuel, the combustion critical temperature hardly changes even if the EGR rate changes, as indicated by a broken line A2 in the map shown in FIG. 8. In consequence, the change in combustion critical temperature over time is substantially constant as indicated by an alternate long and short line shown in FIG. 7, and hardly changes.

In view of the foregoing, during acceleration, it is desirable to lower the combustion critical temperature below the temperature of intake air sucked into the cylinder 2, and realize good combustion. Thus, in this embodiment of the invention, if the temperature of intake air sucked into the cylinder 2 falls below the combustion critical temperature, both a reduction in the supply amount of CNG that is difficult to ignite and an increase in the supply amount of light oil that is easy to ignite are carried out. Specifically, if the temperature of intake air sucked into the cylinder 2 falls below the combustion critical temperature, the ECU 27 causes the light oil injection valve 6 to inject only light oil without causing the CNG injection valve 14 to inject CNG. Incidentally, specific control is not limited to the case where the CNG injection valve 14 is not caused to inject CNG, but the supply amount of CNG may be reduced.

Incidentally, in this embodiment of the invention, both a reduction in the supply amount of GNU that is difficult to ignite and an increase in the supply amount of light oil that is easy to ignite are carried out, but at least one of them may be carried out.

Figure 10:
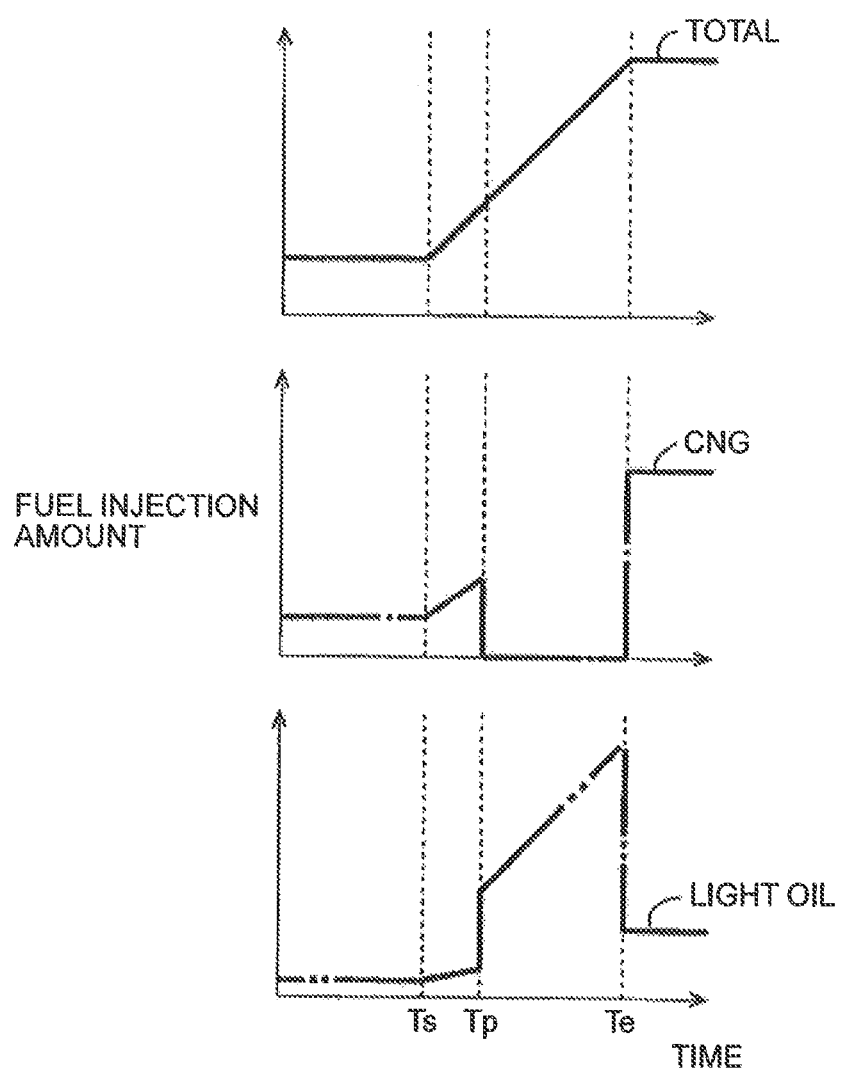
FIG. 10 is a view showing changes in fuel injection amount over time during acceleration according to the first embodiment of the invention.

CNG that is difficult to ignite is difficult to ignite, needs a high temperature to be ignited (burned), and raises the combustion critical temperature. On the other hand, light oil that is easy to ignite is easy to ignite, does not require a high temperature to be ignited (burned), and hence lowers the combustion critical temperature. In this embodiment of the invention, if the temperature of intake air in the intake manifold 12, which is sucked into the cylinder 2, falls below the combustion critical temperature, the supply amount of CNG that is difficult to ignite is reduced, and the supply amount of light oil that is easy to ignite, is increased. FIG. 10 is a view showing changes in fuel injection amount over time during acceleration according to this embodiment of the invention. As shown in FIG. 10, from a time Tp at which the temperature of intake air in the intake manifold 12 falls below the combustion critical temperature after the time Ts, the supply amount of CNG is reduced to zero, and the supply amount of light oil is increased in accordance with the accelerator opening degree. It is appropriate to perform this control until a time Te as an acceleration end time. At and after the time Te, the supply amount of CNG and the supply amount of light oil are returned to their respective normal amounts.

Figure 11:
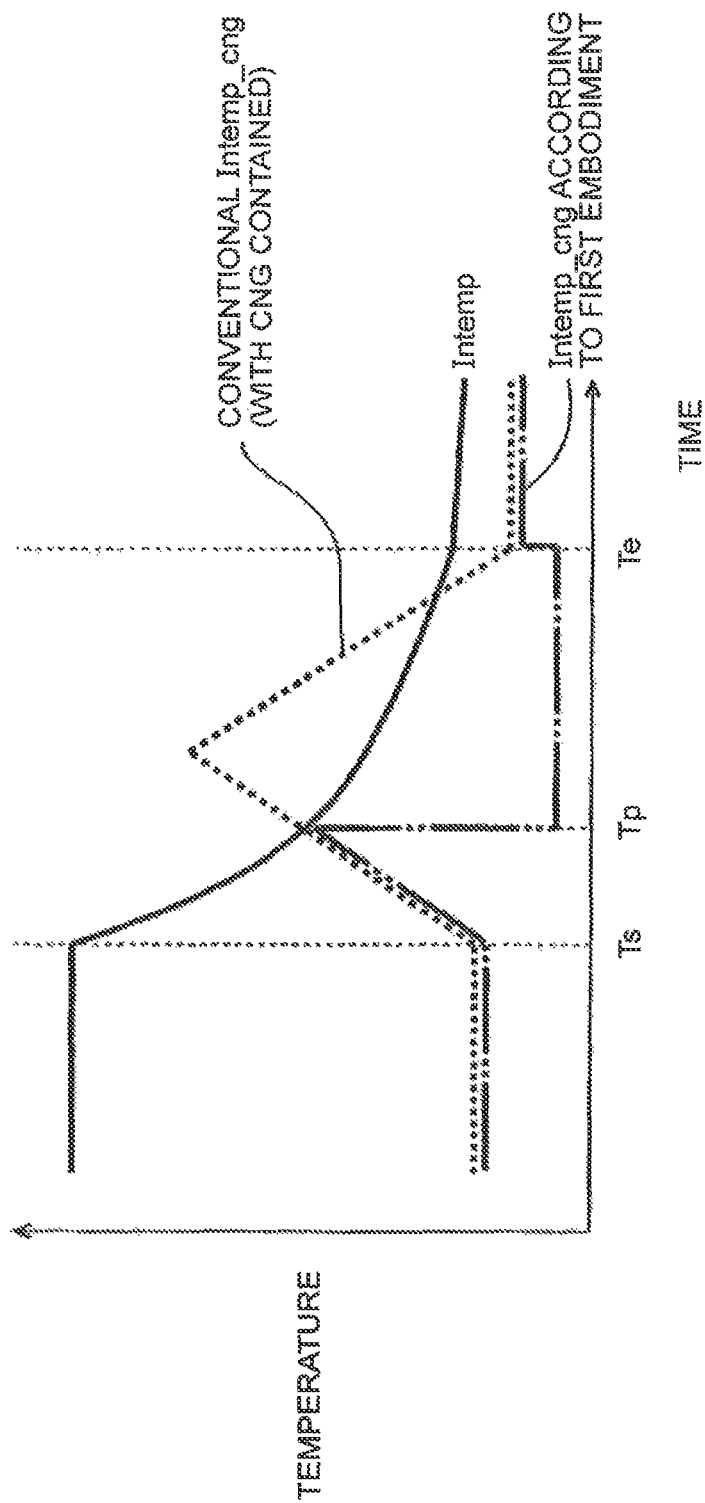
FIG. 11 is a view showing changes in intake air temperature in the intake manifold and combustion critical temperature during acceleration according to the first embodiment of the invention.
Figure 12:
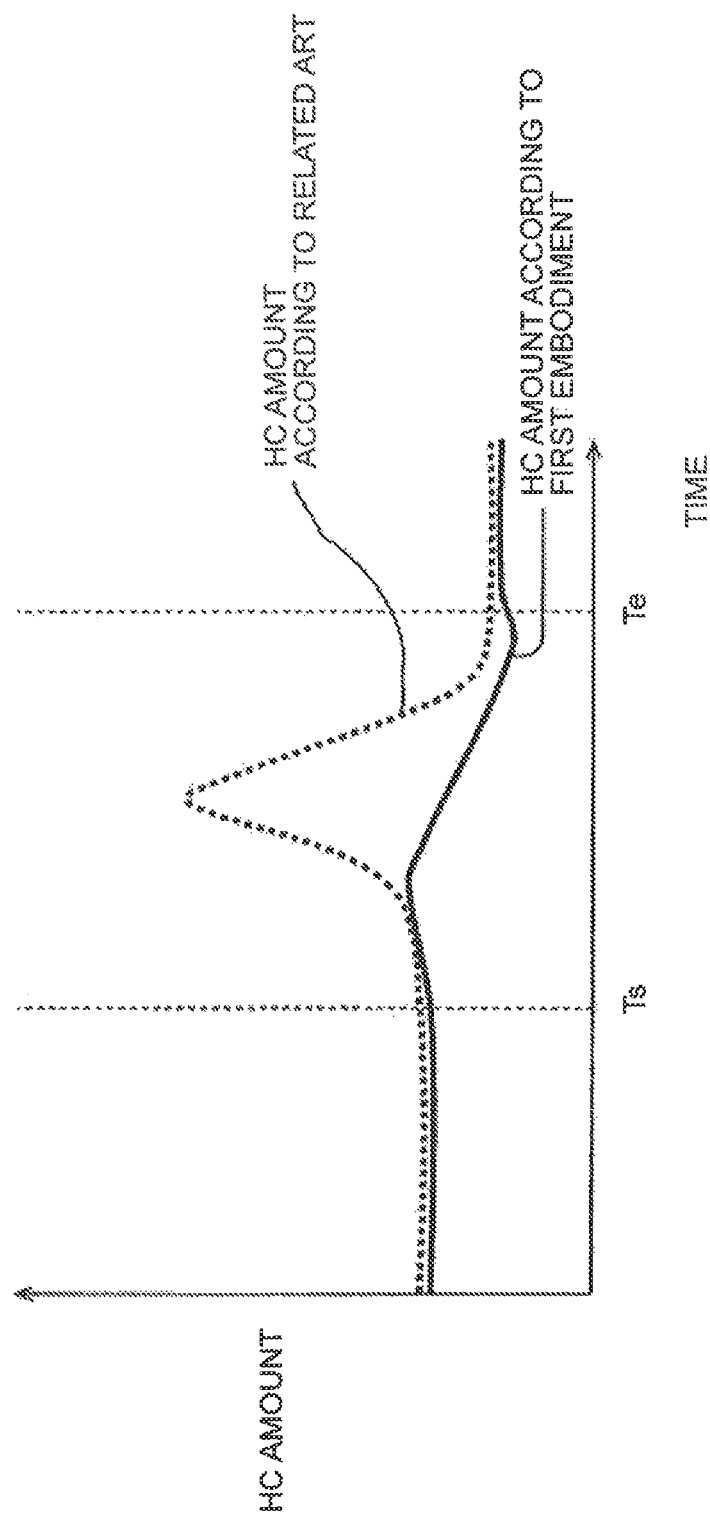
FIG. 12 is a view showing a change in amount of HC discharged from the internal combustion engine over time during acceleration according to the first embodiment of the invention.

According to this embodiment of the invention, the supply amount of CNG that is difficult to ignite, which is predisposed to raise the combustion critical temperature, is reduced, and the combustion critical temperature can be lowered. In addition, the supply amount of light oil that is easy to ignite, which is predisposed to lower the combustion critical temperature, is increased, and the combustion critical temperature can thus be reduced as well. FIG. 11 is a view showing changes in the temperature of intake air in the intake manifold 12 and the combustion critical temperature over time during acceleration according to this embodiment of the invention. In this embodiment of the invention as well as FIG. 7 showing the related art, the temperature of intake air in the intake manifold 12 during acceleration changes over time as indicated by a solid line. On the other hand, as indicated by an alternate long and two short dashes line shown in FIG. 11 if the temperature of intake air in the intake manifold 12 falls below the combustion critical temperature at the time Tp, the supply amount of CNG is reduced, and the supply amount of light oil is increased. Therefore, the combustion critical temperature changes over time to fall in the same manner as in the case where only light oil is supplied. At and after the time Te, the combustion critical temperature returns to a normal combustion critical temperature at which CNG and light oil are supplied. Incidentally, FIG. 11 also shows, by a broken line, a change in combustion critical temperature over time according to the related art, for comparison. If control is thus performed, good combustion can be realized by lowering the combustion critical temperature below the temperature of intake air sucked into the cylinder 2, in the case where the temperature of intake air sucked into the cylinder 2 falls below the combustion critical temperature. FIG. 12 is a view showing a change in the amount of HC discharged from the internal combustion engine 1 over time during acceleration according to this embodiment of the invention. As indicated by a solid line of FIG. 12, a deterioration in combustion such as misfire, an increase in the amount of discharged HC or the like does not occur during acceleration as well, the amount of HG does not increase, and the exhaust emission properties can be restrained from deteriorating. Incidentally, FIG. 12 also shows, by a broken line, a change in the amount of HC discharged from the internal combustion engine 1 over time during acceleration according to the related art, for comparison.

Incidentally, in this embodiment of the invention, the fall in the temperature of intake air sucked into the cylinder below the combustion critical temperature means a case where the temperature of intake air detected by the temperature sensor 17 falls into a state of being lower than the combustion critical temperature derived from the map of FIG. 8. However, the invention is not limited to this case, but is also applicable to a case where the temperature of intake air detected by the temperature sensor 17 is estimated to fall below the combustion critical temperature. For example, if a value obtained by subtracting the combustion critical temperature derived from the map of FIG. 8 from the temperature of intake air detected by the temperature sensor narrows down to become equal to or smaller than a predetermined value, it can be determined that the temperature of intake air is estimated to fall below the combustion critical temperature.

(Acceleration Control Routine 1)

Figure 13:
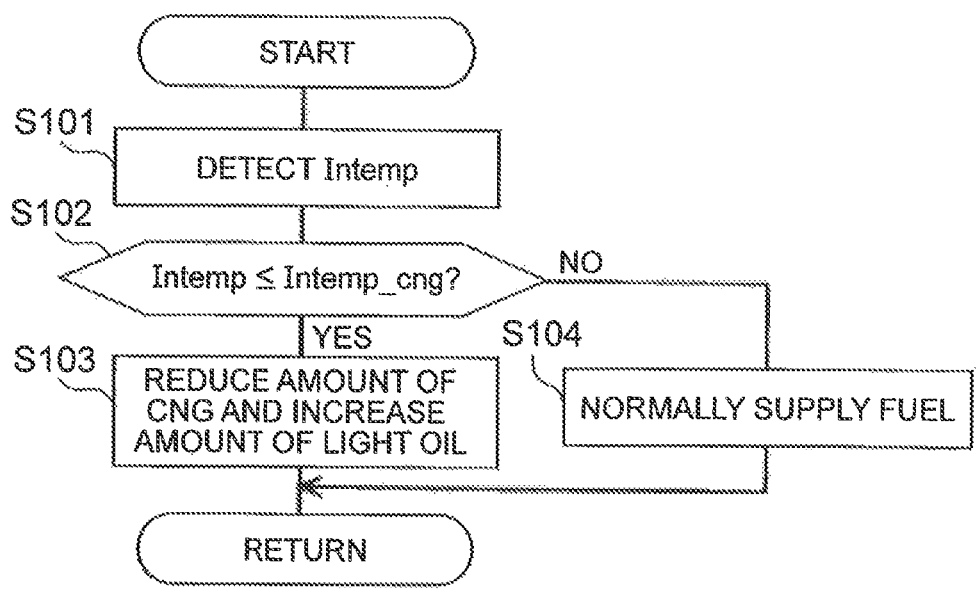
FIG. 13 is a flowchart showing an acceleration control routine 1 according to the first embodiment of the invention.

FIG. 13 is a flowchart showing an acceleration control routine 1 according to this embodiment of the invention. The acceleration control routine 1 will be described on the basis of a flowchart shown in FIG. 13. The present routine is repeatedly executed by the ECU 27 at intervals of a predetermined time.

If the present routine is executed, an intake air temperature Intemp in the intake manifold 12 is first detected in S101. It is determined in S102 whether or not the intake air temperature Intemp falls below a combustion critical temperature Intemp_cng. The combustion critical temperature Intemp_cng is derived from a ratio of an amount of CNG and an EGR rate using a map as shown in FIG. 8, which is prepared in advance. If the result of the determination in S102 is positive, a transition to S103 is made. If the result of the determination in S102 is negative, a transition to S104 is made. In S103, light oil is injected from the light oil injection valve 6, with the supply amount of injected light oil increased in comparison with a case where CNG is also supplied, in accordance with an accelerator opening degree detected by the accelerator opening degree sensor 28, and the CNG injection valve 14 is stopped. On the other hand, in S104, with a view to normally supplying fuel, CNG is injected from the CNG injection valve 14 and light oil is injected from the light oil injection valve 6, in accordance with the accelerator opening degree detected by the accelerator opening degree sensor 28. After the processes of steps S103 and S104, the present routine is temporarily ended.

According to the present routine described above, if the temperature of intake air sucked into the cylinder 2 falls below the combustion critical temperature in the internal combustion engine 1 that supplies CNG and light oil into the cylinder 2, good combustion can be realized by lowering the combustion critical temperature below the temperature of intake air sucked into the cylinder 2.

<Second Embodiment>

In this embodiment of the invention, a case where light oil as a fuel has a low cetane value and the temperature of intake air falls below the combustion critical temperature will be described. In this embodiment of the invention, a configuration characteristic thereof will be described, and the other configurational details described in the foregoing embodiment of the invention will not be described.

Figure 14:
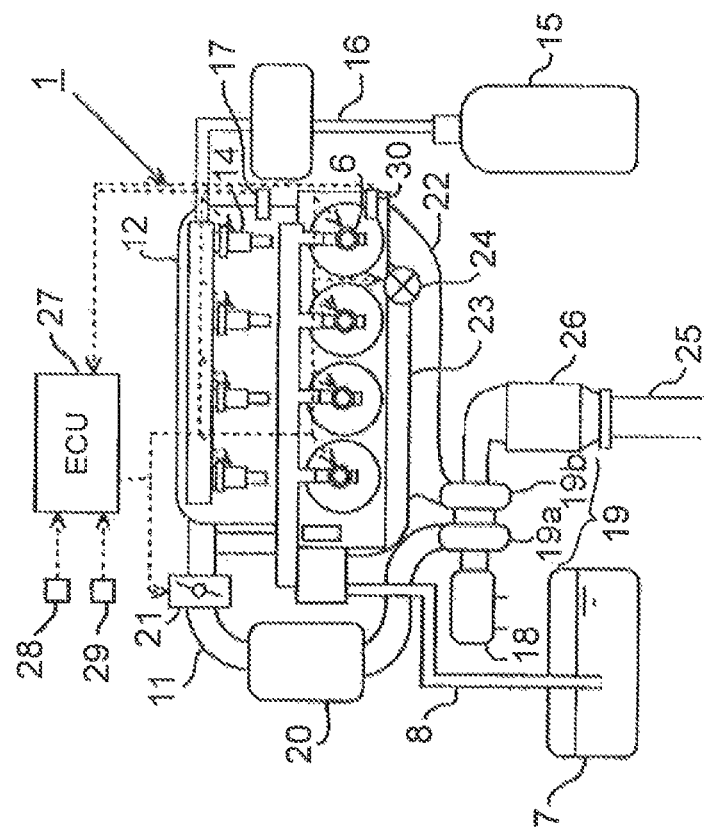
FIG. 14 is a view showing a schematic configuration of an internal combustion engine according to a second embodiment of the invention.

FIG. 14 is a view showing a schematic configuration of an internal combustion engine according to this embodiment of the invention. A cetane value sensor 30 that detects a cetane value of light oil is arranged in the cylinder 2. The cetane value sensor 30 is connected to the ECU 27 via electric wiring, and an output signal of the cetane value sensor 30 is input to the ECU 27.

(Acceleration Control)

Figure 15:
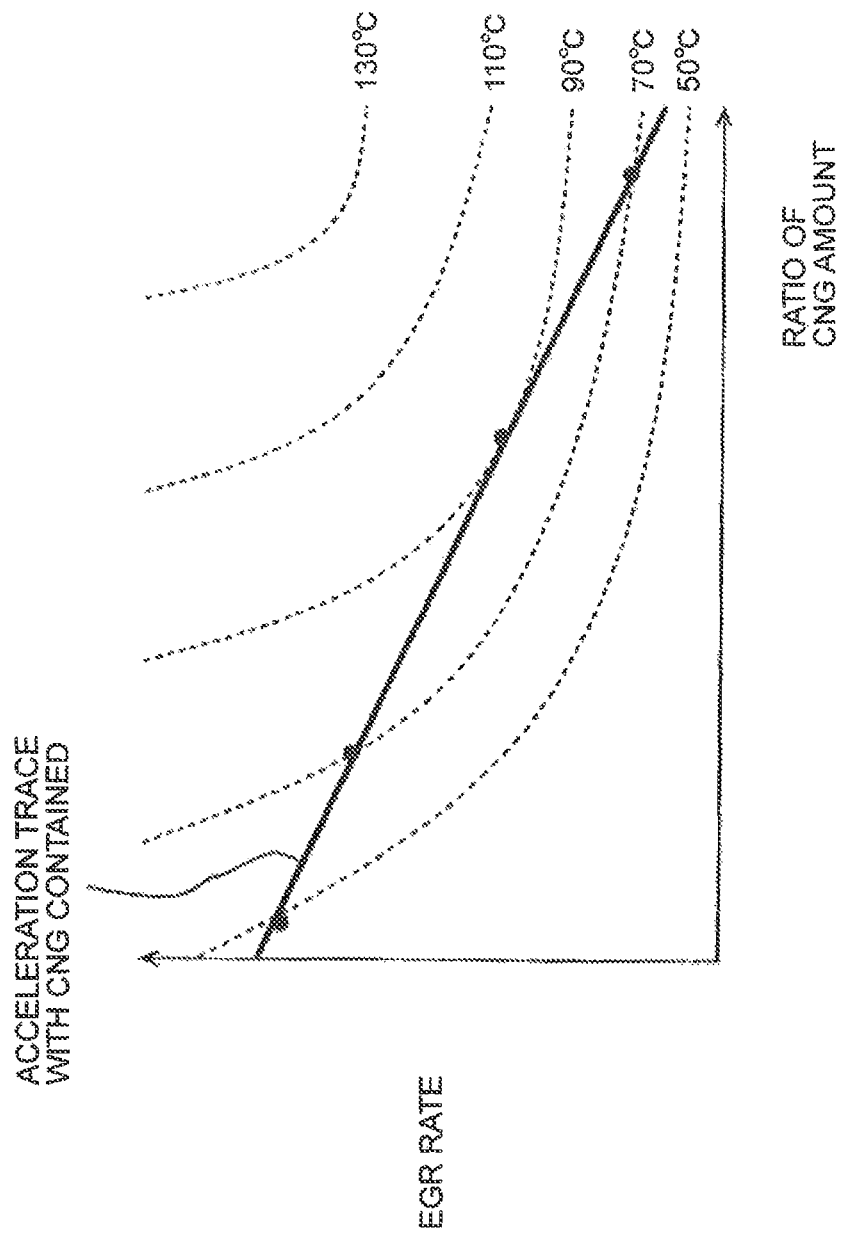
FIG. 15 is a view showing a map that derives a combustion critical temperature from a CNG amount ratio of fuel and an EGR rate in a case where light oil according to the second embodiment of the invention has a low cetane value.

FIG. 15 is a view showing a map that derives a combustion critical temperature from a ratio of an amount of CNG in fuel and an EGR rate in a case where light oil according to this embodiment of the invention has a low cetane value. In the map shown in FIG. 15, the octane value of light oil is lower than in the map shown in FIG. 8 in the first embodiment of the invention, so that the combustion critical temperature is high. This is because light oil becomes difficult to ignite if the cetane value of light oil becomes low.

Thus, in this embodiment of the invention, if light oil has a low cetane value and the temperature of intake air sucked into the cylinder 2 falls below the combustion critical temperature, both a reduction in the supply amount of CNG that is difficult to ignite and an increase in the supply amount of light oil that is easy to ignite are carried out. Specifically, if the temperature of intake air sucked into the cylinder 2 falls below the combustion critical temperature, the ECU 27 causes the light oil injection valve 6 to inject only light oil without causing the CNG injection valve 14 to inject CNG.

Figure 16:
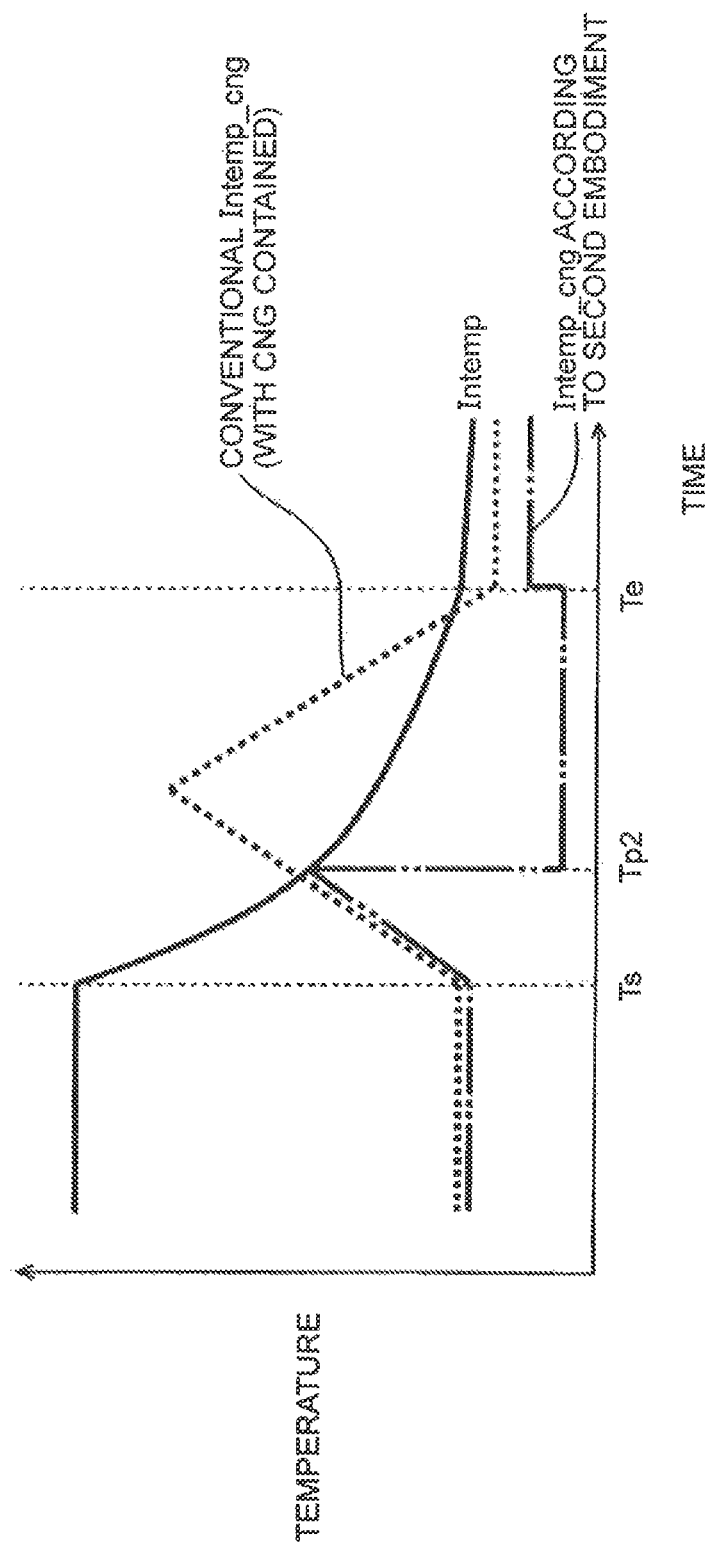
FIG. 16 is a view showing changes in intake air temperature in an intake manifold and combustion critical temperature over time during acceleration according to the second embodiment of the invention.

FIG. 16 is a view showing changes in the temperature of intake air in the intake manifold 12 and the combustion critical temperature over time during acceleration according to this embodiment of the invention. As shown in FIG. 16, from a time Tp2 at which the temperature of intake air in the intake manifold 12 falls below the combustion critical temperature after the time Ts the supply amount of CNG is reduced to zero, and the supply amount of light oil is increased in accordance with the accelerator opening degree. It is appropriate to perform this control until the time Te as an acceleration end time. At and after the time Te, the supply amount of CNG and the supply amount of light oil are returned to their normal respective amounts.

According to this embodiment of the invention, in the case where light oil has a low cetane value and light oil is difficult to ignite, the supply amount of CNS that is difficult to ignite, which is predisposed to raise the combustion critical temperature, is reduced, so that the combustion critical temperature can be lowered. In addition, the supply amount of light oil that is easy to ignite, which is predisposed to lower the combustion critical temperature, is increased, and the combustion critical temperature can thus be lowered as well. If control is thus performed, good combustion can be realized by lowering the combustion critical temperature below the temperature of intake air sucked into the cylinder 2, in the case where the temperature of intake air sucked into the cylinder 2 falls below the combustion critical temperature. In consequence, even in the case where light oil has a low cetane value, a deterioration in combustion such as misfire, an increase in the amount of discharged HC or the like does not occur, the amount of HC does not increase, and the exhaust emission properties can be restrained from deteriorating.

(Acceleration Control Routine 2)

Figure 17:
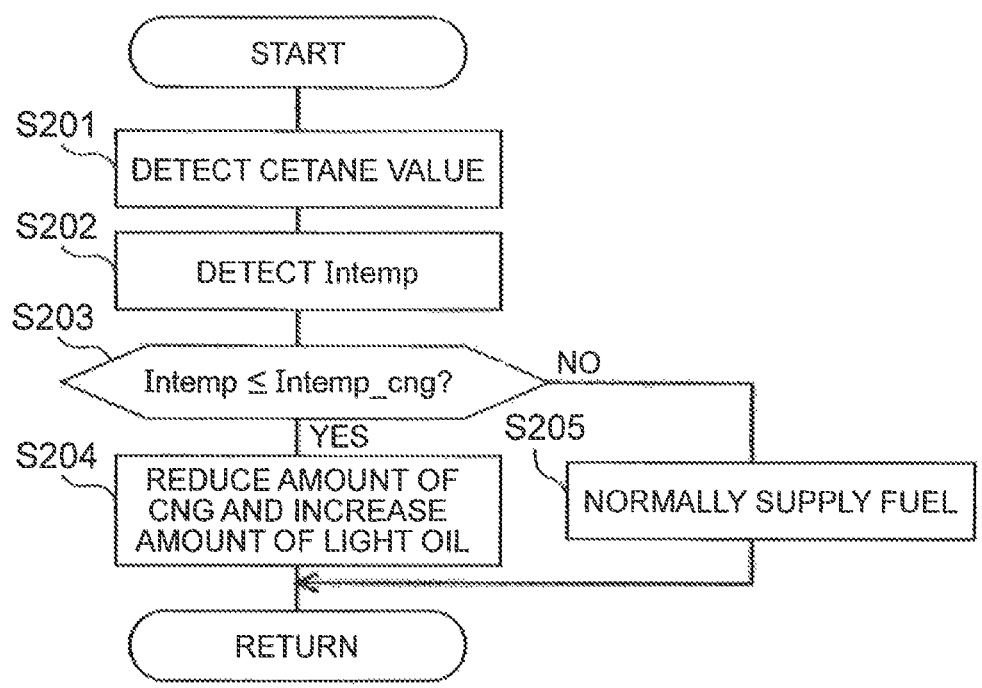
FIG. 17 is a flowchart showing an acceleration control routine 2 according to the second embodiment of the invention.

FIG. 17 is a flowchart showing an acceleration control routine 2. The acceleration control routine 2 will be described on the basis of a flowchart shown in FIG. 17. The present routine is repeatedly executed by the ECU 27 at intervals of a predetermined time.

If the present routine is executed, a cetane value of light oil is first detected in S201 by the cetane value sensor 30. In S202, the intake air temperature Intemp in the intake manifold 12 is detected by the temperature sensor 17. It is determined in S203 whether or not the intake air temperature Intemp falls below the combustion critical temperature Intemp_cng. The combustion critical temperature Intemp_cng is derived from a ratio of an amount of CNG, an EGR rate, and the cetane value, using a map as shown in FIG. 15, which is prepared in advance. If the result of the determination in S203 is positive, a transition to S204 is made. If the result of the determination in S203 is negative, a transition to S205 is made. In 204, light oil is injected from the light oil injection valve 6, with the supply amount of injected light oil increased in comparison with a case where CNG is also supplied, in accordance with the accelerator opening degree detected by the accelerator opening degree sensor 28, and the CNG injection valve 14 is stopped. On the other hand, in S205, with a view to normally supplying fuel, CNG is injected from the CNG injection valve 14 and light oil is injected from the light oil injection valve 6, in accordance with the accelerator opening degree detected by the accelerator opening degree sensor 28. After the processes of steps S204 and S205, the present routine is temporarily ended.

According to the present routine described above, if light oil has a low cetane value and the temperature of intake air sucked into the cylinder 2 falls below the combustion critical temperature in the internal combustion engine 1 that supplies CNG and light oil into the cylinder 2, good combustion can be realized by lowering the combustion critical temperature below the temperature of intake air sucked into the cylinder 2.

<Third Embodiment>

In this embodiment of the invention, a case where CNG as a fuel contains large amounts of $CO_2$ and $N_2$ and the temperature of intake air falls below the combustion critical temperature will be described. In this embodiment of the invention, a configuration characteristic thereof will be described, and the other configurational details described in the foregoing embodiments of the invention will not be described.

Figure 18:
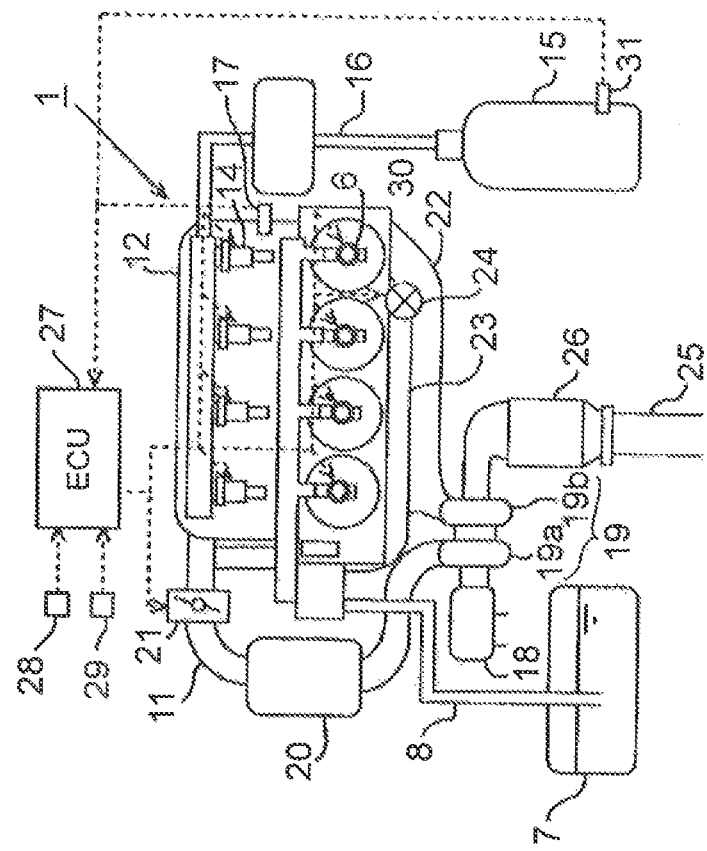
FIG. 18 is a view showing a schematic configuration of an internal combustion engine according to a third embodiment of the invention.

FIG. 18 is a view showing a schematic configuration of an internal combustion engine according to this embodiment of the invention. A CNG property sensor 31 that detects amounts of $CO_2$ and $N_2$ in CNG is arranged in the CNG tank 15. The CNG property sensor 31 is connected to the ECU 27 via electric wiring, and an output signal of the CNG property sensor 31 is input to the ECU 27.

(Acceleration Control)

FIG. 15 is also a view showing a map that derives a combustion critical temperature from a ratio of an amount of CNG in fuel and an EGR, rate in a case where CNG according to this embodiment of the invention contains large amounts of $CO_2$ and $N_2$. In the map shown in FIG. 15, CNG contains larger amounts of $CO_2$ and $N_2$ than in the map shown in FIG. 8 in the first embodiment of the invention, so that the combustion critical temperature is high. This is because CNG is difficult to ignite if CNG contains large amounts of $CO_2$ and $N_2$.

Thus, in this embodiment of the invention, if CNG contains large amounts of $CO_2$ and $N_2$ and the temperature of intake air sucked into the cylinder 2 falls below the combustion critical temperature, both a reduction in the supply amount of CNG that is difficult to ignite and an increase in the supply amount of light oil that is easy to ignite are carried out. Specifically, if the temperature of intake air sucked into the cylinder 2 falls below the combustion critical temperature, the ECU 27 causes the light oil injection valve 6 to inject only light oil, without causing the CNG injection valve 14 to inject CNG.

FIG. 16 is also a view showing changes in the temperature of intake air in the intake manifold 12 and the combustion critical temperature over time during acceleration according to this embodiment of the invention. As shown in FIG. 16, from the time Tp at which the temperature of intake air in the intake manifold 12 falls below the combustion critical temperature after the time Ts as shown in FIG. 16, the supply amount of CNG is reduced to zero, and the supply amount of light oil is increased in accordance with the accelerator opening degree. It is appropriate to perform this control until the time Te as an acceleration end time. At and after the time Te, the supply amount of CNG and the supply amount of light oil are returned to their respective normal amounts.

According to this embodiment of the invention, in the case where CNG contains large amounts of $CO_2$ and $N_2$ and CNG is difficult to ignite, the supply amount of CNG that is difficult to ignite, which is predisposed to raise the combustion critical temperature, is reduced, so that the combustion critical temperature can be lowered. In addition, the supply amount of light oil that is easy to ignite, which is predisposed to lower the combustion critical temperature, is increased, and the combustion critical temperature can thus be lowered as well. If control is thus performed, good combustion can be realized by lowering the combustion critical temperature below the temperature of intake air sucked into the cylinder 2, in the case where the temperature of intake air sucked into the cylinder 2 falls below the combustion critical temperature. In consequence, even in the case where CNG contains large amounts of $CO_2$ and $N_2$, a deterioration in combustion such as misfire, an increase in the amount of discharged HC or the like does not occur, the amount of HC does not increase, and the exhaust emission properties can be restrained from deteriorating.

(Acceleration Control Routine 3)

Figure 19:
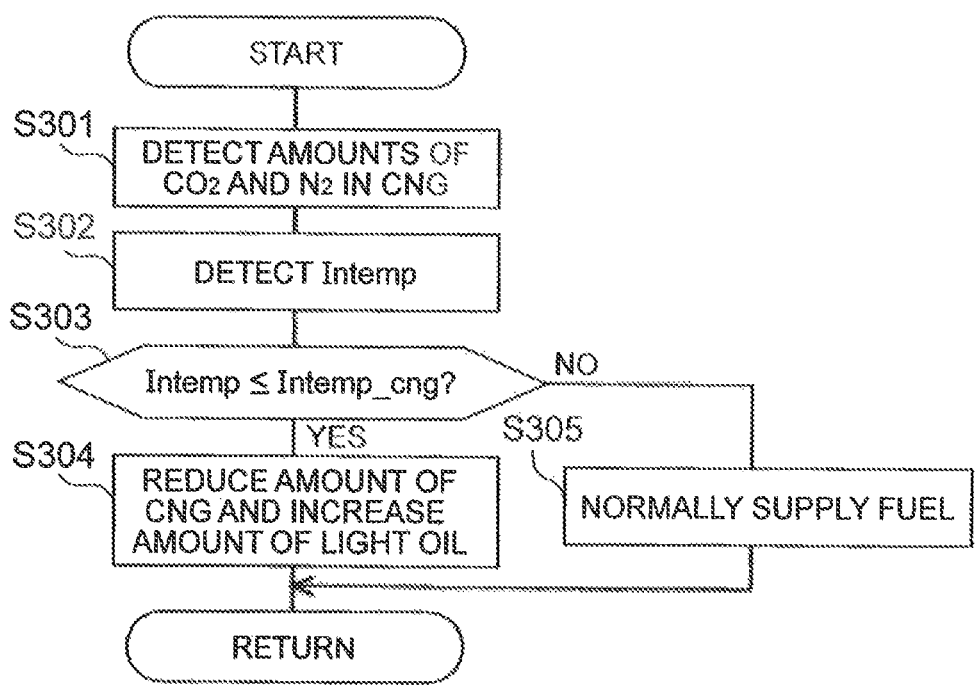
FIG. 19 is a flowchart showing an acceleration control routine 3 according to the third embodiment of the invention.

FIG. 19 is a flowchart showing an acceleration control routine 3. The acceleration control routine 3 will be described on the basis of a flowchart shown in FIG. 19. The present routine is repeatedly executed by the ECU 27 at intervals of a predetermined time.

If the present routine is executed, amounts of $CO_2$ and $N_2$ in CNG are first detected in S301 by the CNG property sensor 31. In S302, the intake air temperature Intemp in the intake manifold 12 is detected by the temperature sensor 17. It is determined in S303 whether or not the intake air temperature Intemp falls below the combustion critical temperature Intemp_cng. The combustion critical temperature Intemp_cng is derived from a ratio of an amount of CNG, an EGR rate, and the amounts of $CO_2$ and $N_2$ in CNG, using a map as shown in FIG. 15, which is prepared in advance. If the result of the determination in S303 is positive, a transition to S304 is made. If the result of the determination in S303 is negative, a transition to S305 is made. In S304, light oil is injected from the light oil injection valve 6 with the supply amount of injected light oil increased in comparison with a case where CNG is also supplied, in accordance with an accelerator opening degree detected by the accelerator opening degree sensor 28, and the CNG injection valve 14 is stopped. On the other hand, in S305, with a view to normally supplying fuel, CNG is injected from the CNG injection valve 14 and light oil is injected from the light oil injection valve 6, in accordance with the accelerator opening degree detected by the accelerator opening degree sensor 28. After the processes of steps S304 and S305, the present routine is temporarily ended.

According to the present routine described above, in the internal combustion engine 1 that supplies CNG and light oil into the cylinder 2, if CNG contains large amounts of $CO_2$ and $N_2$ and the temperature of intake air sucked into the cylinder 2 falls below the combustion critical temperature, good combustion can be realized by lowering the combustion critical temperature below the temperature of intake air sucked into the cylinder 2.

(Others)

The control device for the internal combustion engine according to the invention is not limited to the foregoing embodiments of the invention, but can be altered in various manners without departing from the gist of the invention. In each of the foregoing embodiments of the invention, the exemplary case where the temperature of intake air sucked into the cylinder falls below the combustion critical temperature during acceleration at the time of transient operation of the internal combustion engine has been described. However, the temperature of intake air sucked into the cylinder may fall below the combustion critical temperature during deceleration at the time of transient operation of the internal combustion engine or at the time of steady operation of the internal combustion engine. Besides, each of the foregoing embodiments of the invention is also an embodiment of a control method for an internal combustion engine according to the invention.

DESCRIPTION OF REFERENCE NUMERALS

1 . . . INTERNAL COMBUSTION ENGINE
2 . . . CYLINDER
3 . . . COMBUSTION CHAMBER
4 . . . INTAKE PORT
5 . . . EXHAUST PORT
6 . . . LIGHT OIL INJECTION VALVE
7 . . . LIGHT OIL TANK.
8 . . . LIGHT OIL SUPPLY SYSTEM
9 . . . INTAKE VALVE
10 . . . EXHAUST VALVE
11 . . . INTAKE PIPE
12 . . . INTAKE MANIFOLD
13 . . . DISTRIBUTION PIPE
14 . . . CNG INJECTION VALVE
15 . . . CNG TANK
16 . . . CNG SUPPLY SYSTEM
17 . . . TEMPERATURE SENSOR
18 . . . AIR CLEANER
19 . . . TURBOCHARGER
19a . . . COMPRESSOR
19b . . . TURBINE
20 . . . INTERCOOLER
21 . . . THROTTLE VALVE
22 . . . EXHAUST MANIFOLD
23 . . . EGR PIPE
24 . . . EGR VALVE
25 . . . EXHAUST PIPE
26 . . . EXHAUST GAS PURIFICATION DEVICE
27 . . . ECU
28 . . . ACCELERATOR OPENING DEGREE SENSOR
29 . . . CRANK ANGLE SENSOR
30 . . . CETANE VALUE SENSOR
31 . . . CNG PROPERTY SENSOR

The invention claimed is:

1. A control device for an internal combustion engine comprising a control unit that supplies via a fuel injection valve a first fuel that is difficult to ignite and a second fuel that is easy to ignite into a cylinder, and burns the first fuel that is difficult to ignite as well by igniting the second fuel that is easy to ignite, wherein
the control unit carries out at least one of a reduction in a supply amount of the first fuel that is difficult to ignite and an increase in a supply amount of the second fuel that is easy to ignite, if a temperature of intake air sucked into the cylinder falls below a combustion critical temperature that is determined from a ratio of the first fuel that is difficult to ignite to the fuels supplied into the cylinder and an EGR rate.

2. The control device for the internal combustion engine according to claim 1, wherein the control unit carries out at least one of a reduction in the supply amount of the first fuel that is difficult to ignite and an increase in the supply amount of the second fuel that is easy to ignite, if the temperature of intake air sucked into the cylinder falls below the combustion critical temperature during transient operation of the internal combustion engine.

3. The control device for the internal combustion engine according to claim 1, wherein the control unit carries out at least one of a reduction in the supply amount of the first fuel that is difficult to ignite and an increase in the supply amount of the second fuel that is easy to ignite, if light oil as a fuel has a low cetane value and the temperature of intake air falls below the combustion critical temperature.

4. The control device for the internal combustion engine according to claim 1, wherein the control unit carries out at least one of a reduction in the supply amount of the first fuel that is difficult to ignite and an increase in the supply amount of the second fuel that is easy to ignite, if CNG as a fuel contains large amounts of $CO_2$ and $N_2$ and the temperature of intake air falls below the combustion critical temperature.

5. A control method for an internal combustion engine that supplies a first fuel that is difficult to ignite and a second fuel that is easy to ignite into a cylinder, and burns the first fuel that is difficult to ignite as well by igniting the second fuel that is easy to ignite, comprising
carrying out at least one of a reduction in a supply amount of the first fuel that is difficult to ignite and an increase in a supply amount of the second fuel that is easy to ignite, if an electronic control unit determines a temperature of intake air sucked into the cylinder falls below a combustion critical temperature that is determined from a ratio of the first fuel that is difficult to ignite to the fuels supplied into the cylinder and an EGR rate.

* * * * *